(12) United States Patent
Yu

(10) Patent No.: US 7,336,261 B2
(45) Date of Patent: Feb. 26, 2008

(54) TOUCH PANEL DISPLAY APPARATUS AND METHOD OF FABRICATING THE SAME

(75) Inventor: Hwan Seong Yu, Kyoungsangbuk-do (KR)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/327,617

(22) Filed: Dec. 24, 2002

(65) Prior Publication Data
US 2003/0122799 A1 Jul. 3, 2003

(30) Foreign Application Priority Data
Dec. 28, 2001 (KR) ............... 2001-86557

(51) Int. Cl.
*G06F 3/41* (2006.01)

(52) U.S. Cl. ................................... 345/173

(58) Field of Classification Search ........ 345/173–178; 257/64; 428/323; 178/18.01–18.11, 19.01–19.07; 313/506; 349/12
See application file for complete search history.

(56) References Cited

U.S. PATENT DOCUMENTS 5,225,273 A * 7/1993 Mikoshiba et al. ......... 428/323
5,619,044 A * 4/1997 Makita et al. .............. 257/64
6,507,337 B1 * 1/2003 Sato et al. .................. 345/173
6,690,361 B1 * 2/2004 Kang et al. ................. 345/173
6,847,355 B1 * 1/2005 Nishikawa et al. ......... 345/173
2001/0000961 A1* 5/2001 Hikida et al. ............... 345/173
2001/0019244 A1* 9/2001 Yamazaki et al. .......... 313/506

FOREIGN PATENT DOCUMENTS

CN 1286424 3/2001
JP 8-216327 8/1996

OTHER PUBLICATIONS

Office Action issued by the Japanese Patent Office on Jul. 14, 2006.

* cited by examiner

*Primary Examiner*—David L. Lewis
(74) *Attorney, Agent, or Firm*—McKenna Long & Aldridge LLP

(57) ABSTRACT

A touch panel display apparatus includes an upper sheet having an upper transparent film formed of one of a crystalline transparent conductive material and an amorphous transparent conductive material, and a lower sheet having a lower transparent film formed of one of an other one of the crystalline transparent conductive material and the amorphous transparent conductive material.

9 Claims, 4 Drawing Sheets

TOUCH PANEL DISPLAY APPARATUS AND METHOD OF FABRICATING THE SAME

The present invention claims the benefit of Korean Patent Application No. P2001-86557 filed in Korea on Dec. 28, 2001, which is hereby incorporated by reference.

BACKGROUND OF THE INVENTION

1. Field of the Invention

The present invention relates to a display apparatus, and more particularly to a touch panel display apparatus and a fabricating method thereof.

2. Description of the Related Art

In typical applications for touch panel display apparatus, voltage or current signals are generated corresponding to a position that is pressed on the panel with a stylus pen or a finger, the signals thereby inputting an order or graphic information designated by a user. A resistive touch panel with an analog input method is commonly used, and is integrated with a liquid crystal display panel, such as a flat panel display. The liquid crystal display panel generally controls a light transmittance of liquid crystal cells interposed between two glass substrates to display an image. Each of the liquid crystal cells response to a video signal, i.e., a corresponding pixel signal to control the volume of transmitted light.

FIG. 1 a perspective view of a touch panel apparatus mounted on a liquid crystal display panel according to the related art. In FIG. 1, a touch panel 32 is mounted on a liquid crystal panel 31 and a backlight 33. The touch panel 32 is electrically connected to a computer system 35 via a touch controller 34 and signal lines 36. Accordingly, during operation of the touch panel 32, a voltage value of a contacted position is calculated at the touch controller 34 to recognize coordinates of the contacted position.

FIG. 2 is a cross sectional view of the touch panel apparatus of FIG. 1 according to the related art. In FIG. 2, the liquid crystal display panel 31 includes an upper plate 31a and a lower plate 31b, and the touch panel 32 includes an upper plate 32a and a lower plate 32b, and a polarizer 4 is formed between the liquid crystal display panel 31 and the touch panel 32.

The liquid crystal panel 31 includes liquid crystal material 14 and spacers 5 interposed between the lower plate 31b and the upper plate 31a. A gate line 6, an insulation film 8, a pixel electrode 10a, and a first alignment film 12a are sequentially formed on a lower substrate of the lower plate 31b. The upper plate 31a includes a black matrix 16, a color filter 18, a common electrode 10b, and a second alignment film 12b sequentially formed on the bottom surface thereof. The spacer 5 is formed on the first alignment film 12a before the upper plate 31a is bonded with the lower plate 31b. The spacer 5 separates the upper plate 31a from the lower plate 31b by a uniform gap, thereby creating a uniform thickness of the liquid crystal material 14.

The touch panel 32 includes a spacer 28 formed between the lower plate 32b and the upper plate 32a, and may include a polyethylene terephthalate (PET) film. On a lower sheet 20 of the lower plate 32b is formed a lower transparent film 26, and on an upper sheet 24 of the upper plate 32a is formed an upper transparent film 27. The upper sheet 24 is formed of PET and the lower sheet 20 is formed of one among glass, plastic and PET. The upper and lower transparent films 27 and 26 are formed of transparent conductive material with good transmittance. For example, one of indium-tin-oxide ITO, indium-zinc-oxide IZO and indium-tin-zinc-oxide ITZO.

An upper electrode layer is formed at the end of the upper transparent film 27, and a lower electrode layer is formed at the end of the lower transparent film 26. The upper electrode layer is short-circuited from the lower electrode layer when the upper sheet 24 is pressed by a stylus pen or a finger, thereby generating a current or voltage level signal that varies in accordance with the pressed position. In addition, the upper and the lower electrode layer is formed of a metal material with good conductivity, such as silver Ag. The upper and the lower transparent films 27 and 26 are both formed with an amorphous ITO structure or a crystalline ITO structure.

The polarizer 4 is formed between the lower plate 32b of the touch panel 32 and the upper plate 31a of the liquid crystal display panel 31, and converts visible light into linear polarized light at the both sides of the liquid crystal display panel 31. A first adhesive 1a is formed between the polarizer 4 and the lower plate 32b of the touch panel 32, and a second adhesive 1b is formed between the polarizer 4 and the upper plate 31a.

FIG. 3 is a plane view of an electrode and signal line formed on the touch panel of FIG. 2 according to the related art, and FIG. 4 is a perspective view of upper and lower plates of the touch panel of FIG. 3 according to the related art.

In FIGS. 3 and 4, the upper plate 32a (in FIG. 4) of the touch panel 32 includes X-axis electrodes 27a and 27b formed at the edge thereof along a vertical direction, and signal lines 28c and 28d derived from the center of the X-axis electrode 27a and 27b for supplying the signal with the current or the voltage level to the touch controller 34. The lower plate 32b (in FIG. 4) of the touch panel 32 includes Y-axis electrodes 26a and 26b formed at the edge thereof along a horizontal direction, and signal lines 28a and 28b derived from the center of the Y-axis electrodes 26a and 26b for supplying the signal with the current or the voltage level to the touch controller 34. The signal lines 28a, 28b, 28c, and 28d include a tail part and an electrode extension connected to the electrodes 26a, 26b, 27a, and 27b. Accordingly, the signal lines 28a, 28b, 28c, and 28d derived from the center of the electrodes 26a, 26b, 27a, and 27b extend to one side of the touch panel 32 for make connection to a touch panel controller (not shown).

When the upper and the lower transparent films 27 and 26 of the touch panel 32 are formed of amorphous ITO, the upper and the lower transparent film 27 and 26 have low durability and low wear-resistance. Accordingly, if the touch panel apparatus 32 is used for a long period of time, the upper and lower sheets 24 and 20 begin to separate from the upper and the lower films 27 and 26. Thus, the linearity of the voltage detected from the upper and the lower electrode layers is disrupted. On the other hand, when the upper and the lower transparent films 27 and 26 are formed with the crystalline ITO structure, the transparent films have a flexible property. Such crystalline structure can be formed by depositing ITO material and treating with heat at a high temperature below the melting point. The ITO material has an amorphous structure when depositing the ITO material, and the heat treatment changes it to a crystalline structure. In addition, since the upper and the lower transparent films 27 and 26 of the crystalline ITO structure are flexible, they are not durable. Accordingly, the ITO film easily deteriorates when the touch panel is used for a long period of time, thereby disrupting the linearity of the voltage detected at the upper and the lower electrode layers.

SUMMARY OF THE INVENTION

Accordingly, the present invention is directed to a touch panel apparatus and a fabricating method thereof that substantially obviates one or more of the problems due to limitations and disadvantages of the related art.

An object of the present invention to provide a touch panel apparatus and a fabricating method thereof that improves durability by using both crystalline and amorphous transparent films.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch panel display apparatus includes an upper sheet having an upper transparent film formed of one of a crystalline transparent conductive material and an amorphous transparent conductive material, and a lower sheet having a lower transparent film formed of one of an other one of the crystalline transparent conductive material and the amorphous transparent conductive material.

In another aspect, a method of fabricating a touch panel display apparatus includes forming an upper sheet and a lower sheet, forming a first transparent conductive material having one of a crystalline structure and amorphous structure on the upper sheet to form an upper transparent film, and forming a second transparent conductive material having an other one of the crystalline structure and the amorphous structure on the lower sheet to form a lower transparent film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
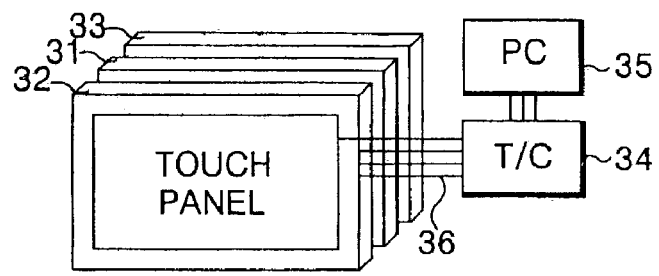
FIG. 1 a perspective view of a touch panel apparatus mounted on a liquid crystal display panel according to the related art.
Figure 2:
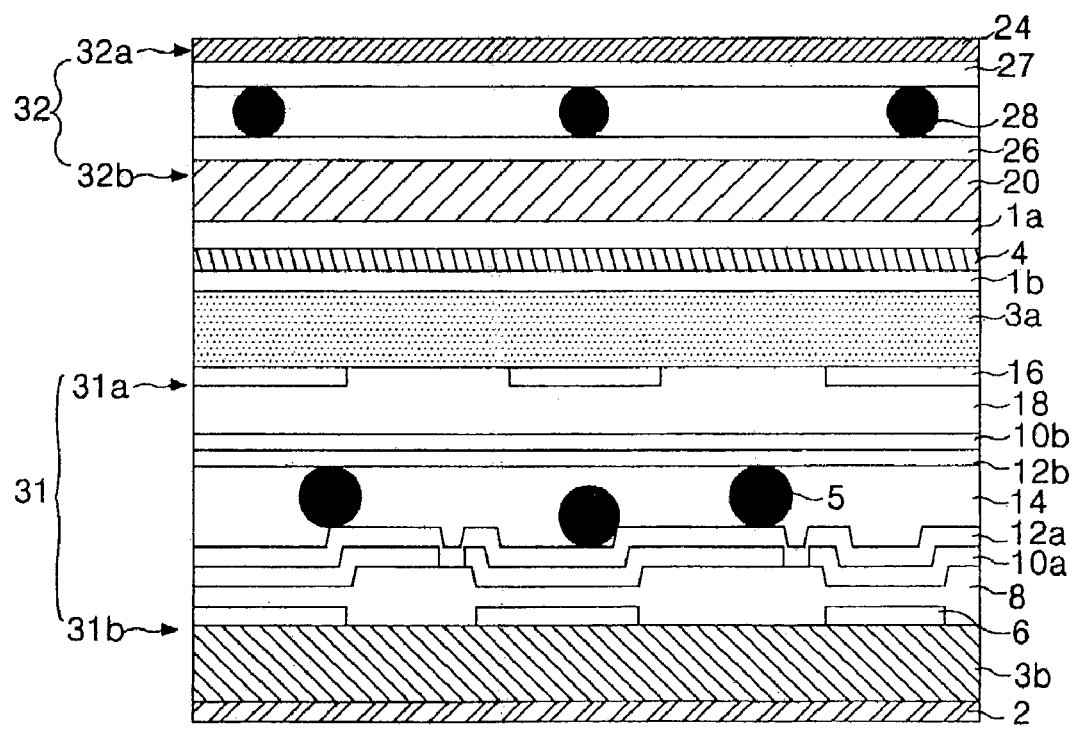
FIG. 2 is a cross sectional view of the touch panel apparatus of FIG. 1 according to the related art.
Figure 3:
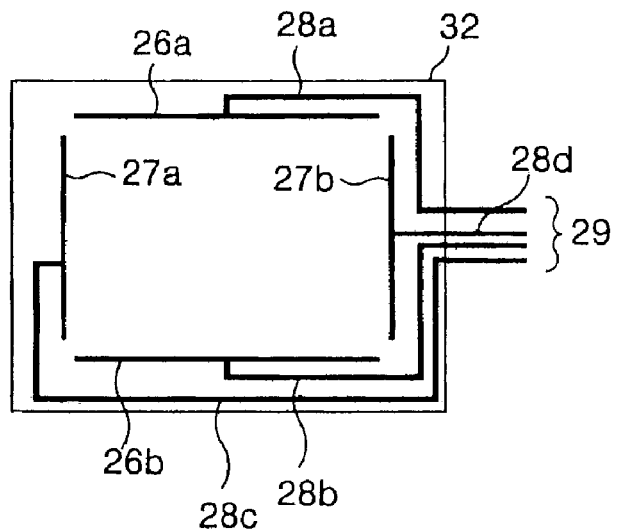
FIG. 3 is a plane view of an electrode and signal line formed on the touch panel of FIG. 2 according to the related art.
Figure 4:
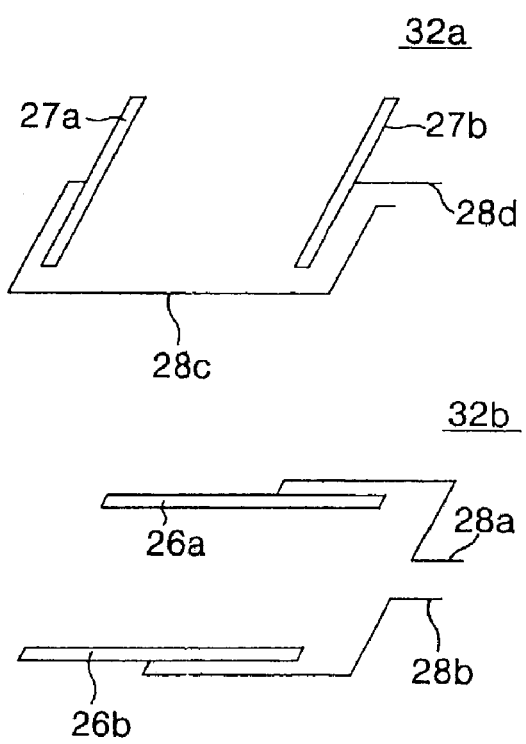
FIG. 4 is a perspective view of upper and lower plates of the touch panel of FIG. 3 according to the related art.
Figure 5:
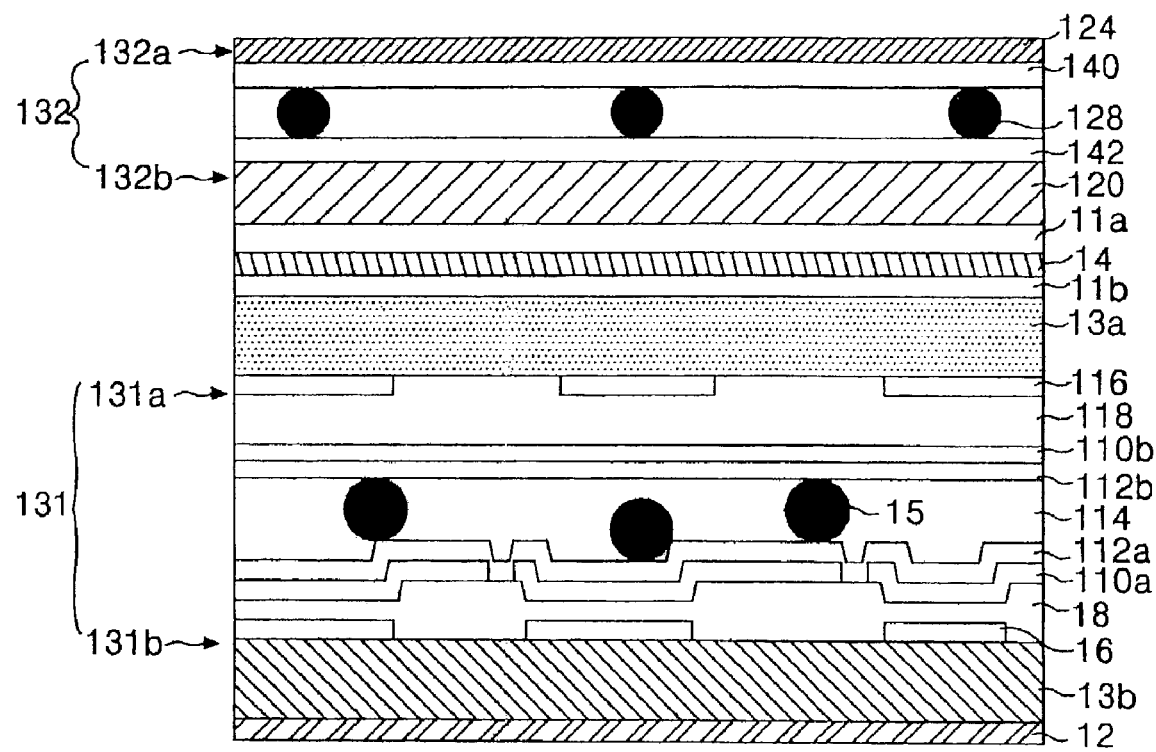
FIG. 5 is a cross sectional view of an exemplary touch panel apparatus mounted on a liquid crystal display panel according to the present invention.

FIG. 5 is a cross sectional view of an exemplary touch panel apparatus mounted on a liquid crystal display panel according to the present invention. In FIG. 5, the touch panel apparatus may include a liquid crystal display panel 131 having an upper plate 131a and a lower plate 131b, a touch panel 132 having an upper plate 132a and a lower plate 132b, and a polarizer 14 formed between the liquid crystal display panel 131 and the touch panel 132. The liquid crystal panel 131 may include liquid crystal material 114 interposed between the lower plate 131b and the upper plate 131a, and a spacer 15. A gate line 16, an insulation film 18, a pixel electrode 110a, and a first alignment film 112a may be sequentially formed on a lower substrate of the lower plate 131b. The upper plate 131a may include a black matrix 116, a color filter 118, a common electrode 110b, and a second alignment film 112b sequentially formed on a bottom surface thereof. The spacer 15 may be formed on the first alignment film 112a before the upper plate 131a is bonded with the lower plate 131b. The spacer 15 may separate the upper plate 131a from the lower plate 131b with a uniform gap maintained to make a thickness of the liquid crystal material 114 uniform.

The touch panel 132 may include a spacer 128 formed between the lower plate 132b and the upper plate 132a, and the spacer 128 may include a PET film. On a lower sheet 120 of the lower plate 132b may be formed a lower transparent film 142, and on an upper sheet 124 of the upper plate 132a may be formed an upper transparent film 140. The upper sheet 124 may include PET, and the lower sheet 120 may include one of glass, plastic, and PET.

An upper electrode layer may be formed at an end of the upper transparent film 140, and a lower electrode layer may be formed at an end of the lower transparent film 142. The upper electrode layer may be short-circuited from the lower electrode layer when the upper sheet 124 is pressed by a stylus pen or a finger, to generate a signal having the current or voltage level variable in accordance with the pressed position. Accordingly, the upper and the lower electrode layer may be formed of a metal material with good conductivity, for example, by printing silver Ag on it.

The upper and lower transparent films 140 and 142 may be formed of one of ITO, IZO, and ITZO. The upper and the lower transparent films 140 and 142 may be deposited to a thickness of about 300 Å. The upper and the lower transparent film 140 and 142 may be formed of ITO materials having different crystalline structures from each other. For example, if the upper transparent film 140 is formed of crystalline ITO material, then the lower transparent film 142 is formed of amorphous ITO material. Alternatively, if the upper transparent film 140 is formed of amorphous ITO material, then the lower transparent film 142 is formed of crystalline ITO material.

The upper and the lower transparent films 140 and 142 may be formed by depositing ITO materials to form amorphous ITO material. Accordingly, the deposition process may be followed by a heat treatment process with a high temperature. For example, after depositing the amorphous ITO material, the amorphous ITO material may be treated with heat at a high temperature below the melting point of the ITO material, whereby the amorphous ITO material may be changed to crystalline ITO material. By forming the upper transparent film 140 and the lower transparent film 142 of different crystal structured ITO materials, durability and wear-resistance may be increased and brittleness be overcome.

Figure 6:
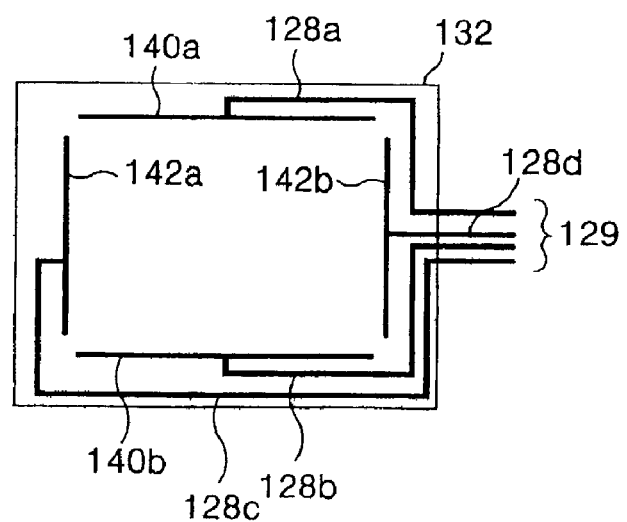
FIG. 6 is a plan view of an exemplary electrode and signal line formed on the touch panel of FIG. 5 according to the present invention.
Figure 7:
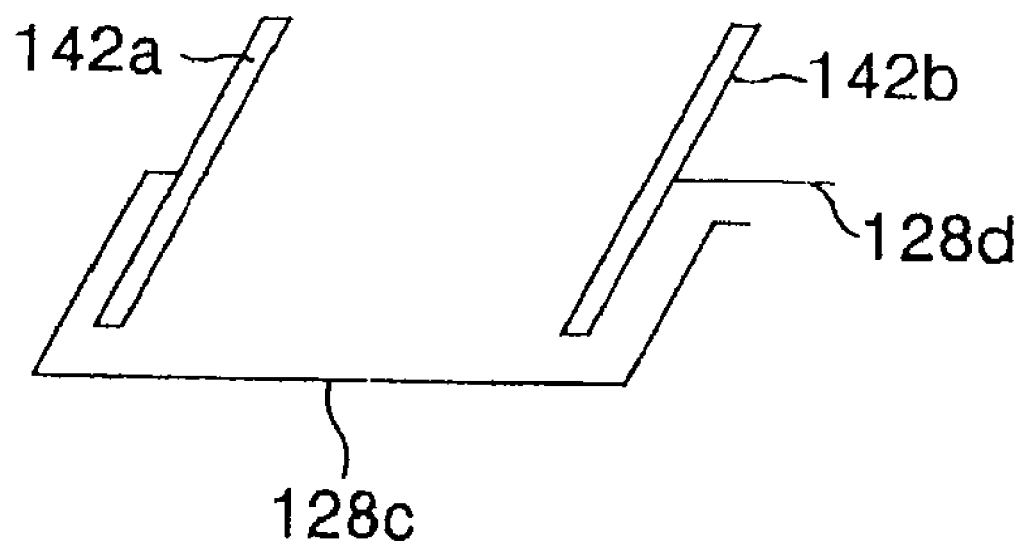
FIG. 7 is a perspective view of exemplary upper and lower plates of the touch panel of FIG. 6 according to the present invention.
Figure 7:
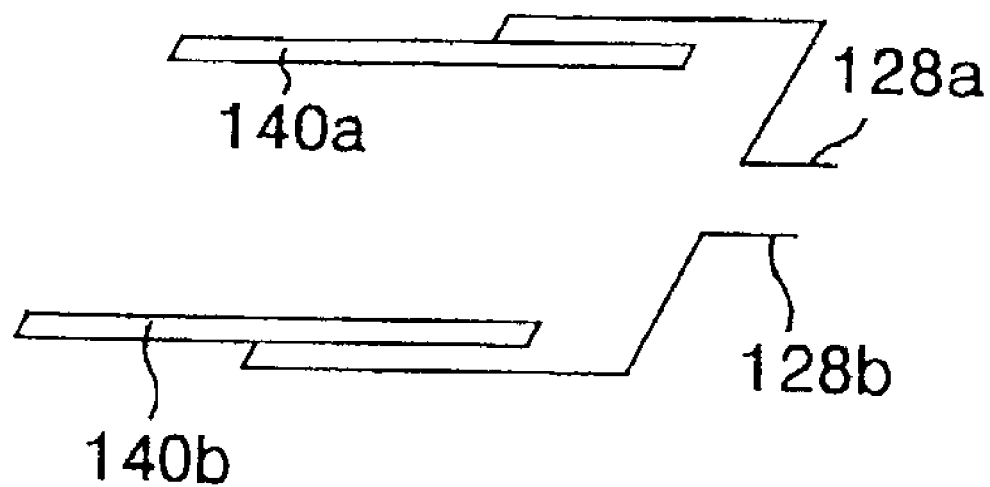

FIG. 6 is a plan view of an exemplary electrode and signal line formed on the touch panel of FIG. 5 according to the present invention, and FIG. 7 is a perspective view of exemplary upper and lower plates of the touch panel of FIG. 6 according to the present invention. In FIG. 6, the upper plate 132a (in FIG. 5) of the touch panel 132 may include X-axis electrodes 142a and 142b formed along an edge thereof along a vertical direction, and signal lines 128c and 128d may be derived from a center of the X-axis electrode 142a and 142b for supplying the current or the voltage level signals to a touch controller (not shown).

In FIG. 7, the lower plate 132b of the touch panel 132 may include Y-axis electrodes 142a and 142b formed along an edge thereof along a horizontal direction, and signal lines 128a and 128b may be derived from a center of the Y-axis electrodes 142a and 142b for supplying the current or voltage level signals to the touch controller (not shown). The signal lines 128a, 128b, 128c, and 128d may include a tail part and an electrode extension connected to the electrodes 142a, 142b, 140a, and 140b. Accordingly, the signal lines 128a, 128b, 128c, and 128 may be derived from a center of the electrodes 142a, 142b, 140a, and 140b extended to one side of the touch panel 132 to make the connection to the touch controller (not shown).

The touch panel apparatus according to the present invention may be applicable to Plasma Display Panels (PDP), Field Emission Displays (FED), and Electro Luminescence Devices (ELD) in addition to a liquid crystal display panel formed at a bottom of a touch panel.

It will be apparent to those skilled in the art that various modifications and variations can be made in the touch panel apparatus and method of fabricating the same of the present invention without departing from the spirit or scope of the invention. Thus, it is intended that the present invention cover the modifications and variations of this invention provided they come within the scope of the appended claims and their equivalents.

What is claimed is:

1. A touch panel display apparatus, comprising:
   a first sheet;
   a first transparent film formed on the first sheet, wherein the first transparent film is transparent conductive material having one of a crystalline and an amorphous structure;
   a second sheet;
   a second transparent film formed on a surface of the second sheet facing the first transparent film, wherein the second transparent film is a transparent conductive material having the opposite one of a crystalline and an amorphous structure as the material used to form the first transparent film.

2. The apparatus according to claim 1, further comprising a liquid crystal display device positioned on a bottom surface of one of the first and second sheets.

3. The apparatus according to claim 1, wherein the first and second transparent films both include one of indium-tin-oxide, indium-zinc-oxide, and indium-tin-zinc-oxide.

4. The apparatus according to claim 1, further comprising an electrode layer formed along outer areas of the first and second sheets, and a spacer formed between the first and second transparent films for maintaining a specific gap therebetween.

5. A method of fabricating a touch panel display apparatus, comprising steps of:
   forming a first sheet and a second sheet;
   forming a first transparent conductive material having one of a crystalline and an amorphous structure on the first sheet to form a first transparent film; and
   forming a second transparent conductive material having the opposite one of a crystalline and an amorphous structure as the material used to form the first transparent film on the second sheet to form a second transparent film.

6. The method according to claim 5, further comprising a step of positioning a liquid crystal display device at a bottom surface of the second sheet.

7. The method according to claim 5, wherein the crystalline structure is formed by a heat treatment applied to an amorphous transparent conductive material at a temperature below a melting point of the transparent conductive material.

8. The method according to claim 5, wherein the first and the second transparent films are formed of one of indium-tin-oxide, indium-zinc-oxide, and indium-tin-zinc-oxide.

9. The method according to claim 5, further comprising steps of forming an electrode layer along an outer area of the first and second sheets for supplying a voltage, and forming a spacer between the first and second transparent films for maintaining a specific gap therebetween.

* * * * *